US008643221B2

(12) United States Patent
Armstrong et al.

(10) Patent No.: US 8,643,221 B2
(45) Date of Patent: Feb. 4, 2014

(54) RETROFIT KIT, CIRCUITRY AND METHOD FOR RECONFIGURING A TAP CHANGER TO AVOID ELECTRICAL ARCING

(75) Inventors: James K. Armstrong, Brandon, MS (US); Muhammad Sohail, Madison, MS (US)

(73) Assignee: Siemens Energy, Inc., Orlando, FL (US)

( * ) Notice: Subject to any disclaimer, the term of this patent is extended or adjusted under 35 U.S.C. 154(b) by 740 days.

(21) Appl. No.: 12/795,802

(22) Filed: Jun. 8, 2010

(65) Prior Publication Data

US 2011/0297517 A1 Dec. 8, 2011

(51) Int. Cl.
*G06F 13/40* (2006.01)

(52) U.S. Cl.
USPC .......... 307/134

(58) Field of Classification Search
USPC .......... 323/255, 256, 257, 258; 200/11 TC; 307/134
See application file for complete search history.

(56) References Cited

U.S. PATENT DOCUMENTS 3,735,243 A 5/1973 Downs
4,081,741 A 3/1978 Palmer
4,130,789 A 12/1978 Neumann
4,161,638 A 7/1979 Ettinger
4,201,938 A 5/1980 Neumann
4,301,489 A 11/1981 Stich
4,363,060 A 12/1982 Stich
4,388,664 A 6/1983 Watanabe
5,056,377 A 10/1991 Yatchum
5,119,012 A 6/1992 Okamura
5,128,605 A 7/1992 Dohnal
5,191,179 A 3/1993 Yatchum
5,266,759 A 11/1993 Dohnal
5,545,974 A 8/1996 Trainor et al.
5,594,223 A * 1/1997 Fukushi et al. .......... 218/120
5,633,580 A 5/1997 Trainor
5,773,970 A 6/1998 Dohnal
5,793,008 A 8/1998 Mayo
6,347,615 B1 2/2002 Hopfl
6,965,217 B2 11/2005 Dohnal
2007/0057652 A1* 3/2007 Hoffman et al. .......... 323/258

FOREIGN PATENT DOCUMENTS

GB 2457079 A 8/2009
JP 2002319512 A * 10/2002
WO WO 2006/103268 10/2006
WO 2008024417 A2 2/2008

OTHER PUBLICATIONS

Fohrhaltz, H.A.; , "Load Tap Changing with Vacuum Interrupters," Power Apparatus and Systems, IEEE Transactions on , vol. PAS-86, No. 4, pp. 422-428, Apr. 1967.*

(Continued)

*Primary Examiner* — Daniel Cavallari

(57) ABSTRACT

Retrofit kit, circuitry and method are provided for reconfiguring a tap changer (18). The retrofit kit may be used to retrofit a tap changer having contacts (15) subject to electrical arcing so that when the kit is installed such contacts are no longer exposed to electrical arcing. The circuitry may include a vacuum switch assembly (100) having a first vacuum interrupter (202) electrically coupled to a first electrical contact of the tap changer. A second vacuum interrupter (204) may be electrically coupled to a second electrical contact of the tap changer. The first and second vacuum interrupters may be selectively actuated to a respective circuit-interrupting condition when a tap change is performed to avoid formation of electrical arcing on the first and second movable contacts (15).

15 Claims, 4 Drawing Sheets

(56) References Cited

OTHER PUBLICATIONS

Dohnal, et al. "Vacuum Switching, A Well Proven Technology Has Found Its Way Into Resistance-Type Load Tap Changers"; In 2001 IEEE/PES Transmission and Distribution Conference and Exposition, Oct. 28-Nov. 2, 2001 , vol. 1; pp. 161-165.

Dieter Dohnal; "On-Load Tap Changers for Power Transformers A Technical Digest", MR Publication; 26 Pgs; Germany.

* cited by examiner

RETROFIT KIT, CIRCUITRY AND METHOD FOR RECONFIGURING A TAP CHANGER TO AVOID ELECTRICAL ARCING

FIELD OF THE INVENTION

The present invention is generally related to a tap changer (e.g., as may be used in a voltage regulator) having a plurality of tap positions selectable to adjust the performance of a transformer based upon the electrical load thereon. More particularly, the present invention relates to retrofit kit, circuitry and method that allow reconfiguring a tap changer to avoid electrical arcing.

BACKGROUND OF THE INVENTION

A tap changer may be connected to a transformer to produce an output voltage that is self-regulated (i.e., substantially constant at a predetermined target level) despite fluctuations that may occur in the input voltage and/or load. An AC voltage regulator for industrial use may typically comprise a tap changer having a number of spaced-apart output terminals and performs its regulatory function by adjusting the tap position (i.e., tapping the output terminals at a selectable position) so that, for a given input voltage, the output is taken from whichever tap yields an output voltage closest to the target level.

In known tap changer circuitry, movable contacts may operate at relatively high voltages (e.g., thousands of volts) and thus such contacts may be subject to electrical arcing during tap changes. Although the movable contacts are rated to withstand electrical arcing, in practice the repeated exposure to electrical arcing may lead to eventual wear and tear (e.g., burning and/or electrical erosion) of the movable contacts of the tap changer, which may require relatively frequent maintenance to address such wear and tear. Additionally, the electrical arcing may lead to other operational drawbacks, such as the formation of combustible gases and/or debris in an insulating transformer oil. In view of the foregoing considerations, it is desirable to provide an improved tap changer circuitry that reliably and in a cost-effective manner avoids or reduces the drawbacks discussed above

BRIEF DESCRIPTION OF THE DRAWINGS

The invention is explained in the following description in view of the drawings that show.

DETAILED DESCRIPTION OF THE INVENTION

Figure 1:
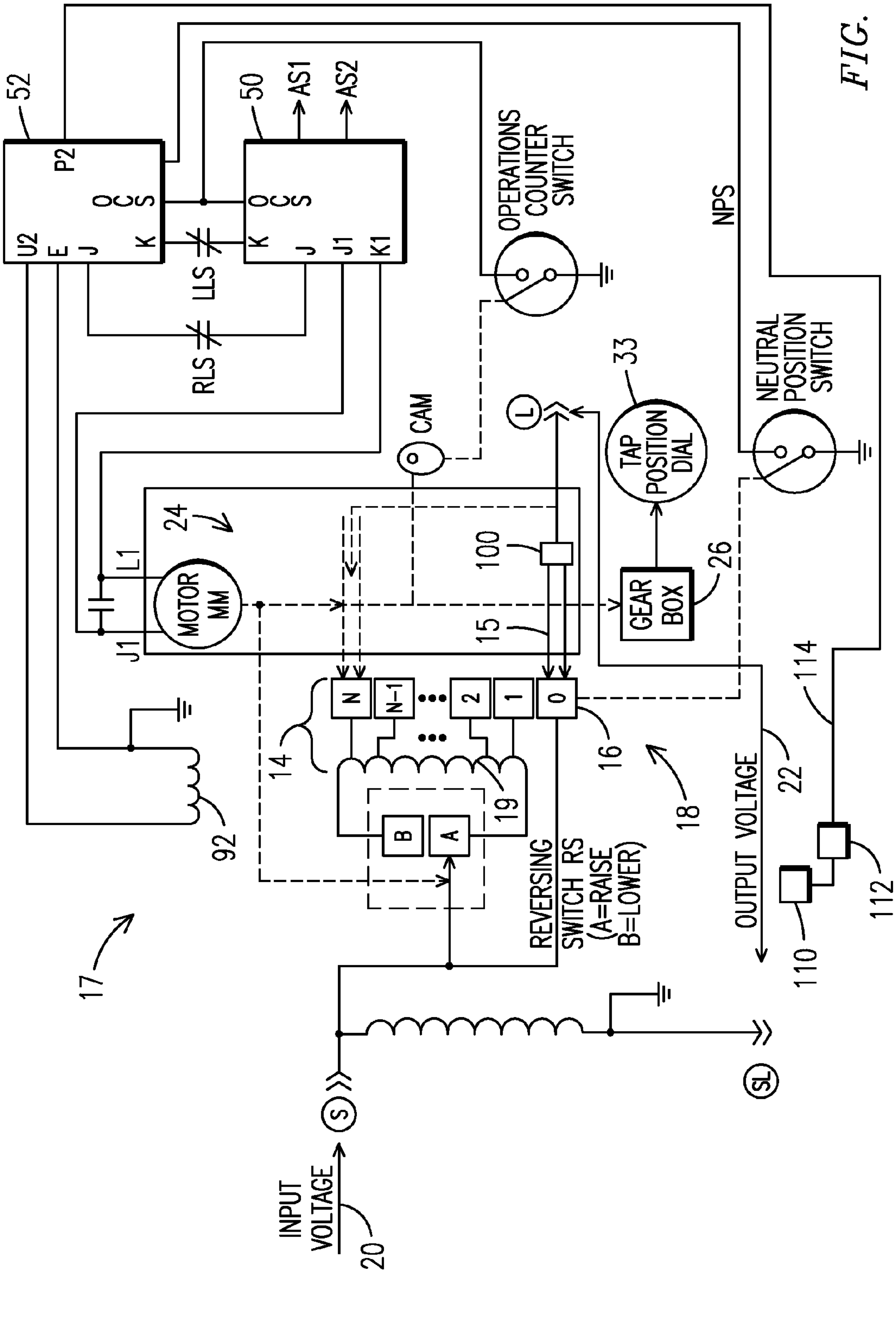
FIG. 1 is a schematic of a voltage regulator including a tap changer and a vacuum switch assembly, which in accordance with aspects of the present invention allows reconfiguring the circuitry of the tap changer to avoid the formation of electrical arcing on movable contacts of the tap changer, while providing uninterrupted electrical power to an electrical load.

Referring to FIG. 1, a voltage regulator 17 may include a tap changer 18 embodying aspects of the present invention. Tap changer 18 includes a plurality of taps 14 electrically connected to a regulating transformer 19. The plurality of taps 14 may include a neutral tap 0 and taps 1, 2, . . . N−1, N for raising (boosting) or lowering (bucking) an input voltage 20 supplied on a line S. Tap changer 18 effectively forms an adjustable transformer, which transforms input voltage 20 to produce an output voltage 22 on a line L, based on the specific tap 0, 1, 2 . . . N−1, N being activated by tap changer 18. Tap activation may occur by moving a pair of movable contacts 15 into contact with a desired tap 14. If contacts 15 are entirely on the neutral tap 0, the output voltage 22 is equal to the input voltage 20. If contacts 15 are on the 0 and 1 taps, tap changer 18 produces a one-raise or a one-lower output, depending on whether a reversing switch RS is on terminal A or on terminal B. If the reversing switch RS is on terminal A, this results in a raise; if it is on terminal B, this results in a lower (unless, the tap changer 18 is on the neutral tap 0).

In one example embodiment, tap changer 18 can move contacts 15 from the neutral position 0 through a one-raise to a sixteen-raise (with the reversing switch RS on terminal A) or from a one-lower to a sixteen-lower (with the reversing switch on terminal B). If, for example, the dynamic range D is plus or minus 10% with respect to a nominal input voltage, each step of the tap changer provides an adjustment of the output voltage equal to ⅝% (10⁄16) % of D/2. It will be readily appreciated that a finer adjustment may be obtained by providing a larger number of taps 14, for example.

A motor MM may be part of a drive 24 arranged to cause controlled movement of movable contacts 15. Motor MM may be responsive to a controller 50 arranged to determine tap change direction (raise or lower) when a tap change is detected. For example, if a raise signal (J) is active, an up/down counter (not shown) is incremented. Similarly, if a lower signal (K) is active, the up/down counter is decremented. The up/down counter stops incrementing/decrementing at a predefined maximum positive or maximum negative value (e.g. +10 and −10). Thereafter, when a tap change is detected via an OCS signal, as may be activated by an Operations Counter Switch, controller 50 determines the direction of the tap change based on the value of the up/down counter. Drive 24 may be mechanically coupled through a gear box 26 to a tap position dial 33, which provides a visual indication of the tap position.

Controller 50 may be electrically powered by a voltage regulator control panel 52 that receives unregulated power from a power winding 92 through connectors U2 and E. Initialization (synchronization) of the up/down counter may be performed when control panel 52 senses that the tap is on the neutral tap position 0. This may be performed when control panel 52 senses a signal NPS triggered by a Neutral Position Switch when contacts 15 are on the neutral tap 0. Control panel 52 may be coupled to monitor load voltage by way of a voltage sensor 110 through a signal conditioner 112, which supplies a conditioned signal via a line 114. As will be appreciated by one skilled in the art, the structural and/or operational relationships described thus far encompass relationships that generically apply to standard tap changer operation.

The inventors of the present invention have developed innovative retrofit circuitry and methodology that through the use of a vacuum switch assembly 100 allow reconfiguring the tap changer to avoid the formation of electrical arcing, which otherwise could detrimentally affect movable contacts 15. In one example embodiment, vacuum switch assembly 100 comprises a pair of vacuum interrupters 202 and 204 respectively connected in series circuit with movable contacts 15, as shown in FIGS. 2A-2E. Controller 50 is coupled to vacuum switch assembly 100 to control by way of actuating signals AS1 and AS2 the respective switching state of vacuum interrupters 202 and 204 to avoid electrical arcing formation at movable contacts 15, while providing uninterrupted electrical power to an electrical load (not shown).

It will be appreciated that the control aspects of controller 50 in connection with vacuum switch assembly 100 can take the form of a hardware embodiment, a software embodiment or an embodiment containing both hardware and software elements, which may include firmware, resident software, microcode, etc. Furthermore, aspects of the controller may take the form of a computer program product accessible from a computer-usable or computer-readable medium providing program code for use by or in connection with a computer or any instruction execution system. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A signal processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

In one advantageous aspect of the present invention, vacuum switch assembly 100 and a suitably configured controller 50 may be provided in the form of a kit suitable to retrofit field-deployed tap changers. This allows a cost-effective implementation that substantially reduces maintenance of the tap changer in connection with wear and tear of the movable contacts. In an alternative embodiment, movable contacts 15, which in accordance with aspects of the present invention are no longer subject to electrical arcing, may be replaced by contacts not rated to withstand electrical arcing, thereby providing incremental savings in the manufacturing and/or maintenance costs of the tap changer.

Figure 2A:
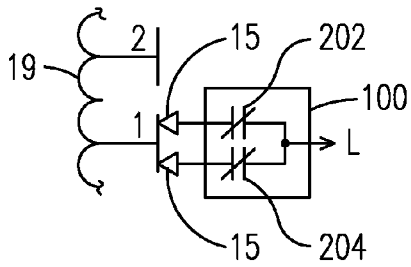
FIGS. 2A-2E illustrates respective example switching states of a pair of vacuum interrupters, which are part of the vacuum switch assembly shown in FIG. 1.

FIG. 2A-2E illustrates the respective switching states of vacuum interrupters 202 and 204, during respective stages of an example operational condition of movable contacts 15, such as during an example tap change. FIG. 2A represents an initial stage where contacts 15 are stationary and electrically connected to tap 1 (e.g., in a non-bridging condition). During this initial stage, vacuum interrupters 202 and 204 are both closed, thereby each is electrically coupled through tap 1 with regulating winding 19.

Figure 2B:
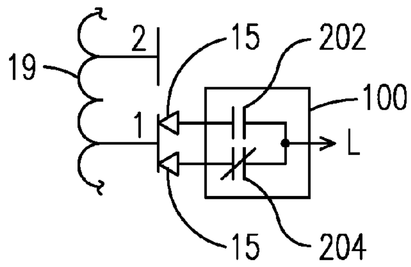

FIG. 2B represents a second stage where contacts 15 are moving from tap 1 to tap 2 but still electrically connected to tap 1. During this stage, vacuum interrupter 202 is set open and vacuum interrupter 204 remains closed.

Figure 2C:
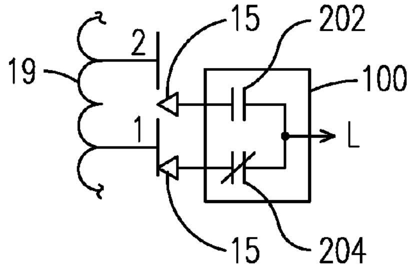

FIG. 2C represents a second stage where contacts 15 are moving from tap 1 to tap 2 and one of contacts 15 is no longer electrically connected to tap 1. During this stage, vacuum interrupter 202 remains open and vacuum interrupter 204 remains closed.

Figure 2D:
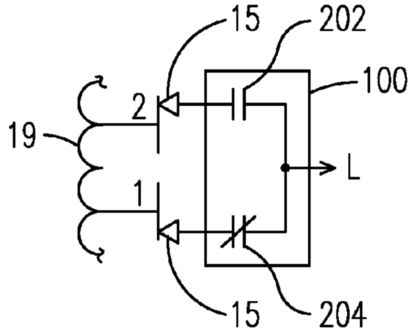

FIG. 2D represents a third stage where contacts 15 are moving while in a bridging condition with respect to taps land 2. During this operational condition, vacuum interrupter 202 continues open and vacuum interrupter 204 continues closed.

Figure 2E:
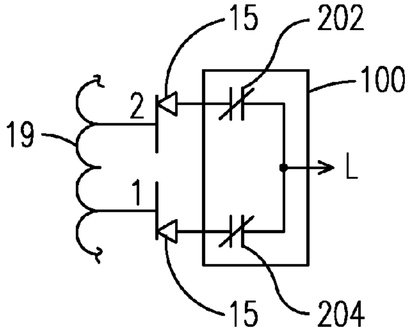

FIG. 2E represents a final stage where contacts 15 are stationary while in the bridging condition with respect to taps land 2. During this operational condition, vacuum interrupters 202 and 204 are both closed.

Figure 3:
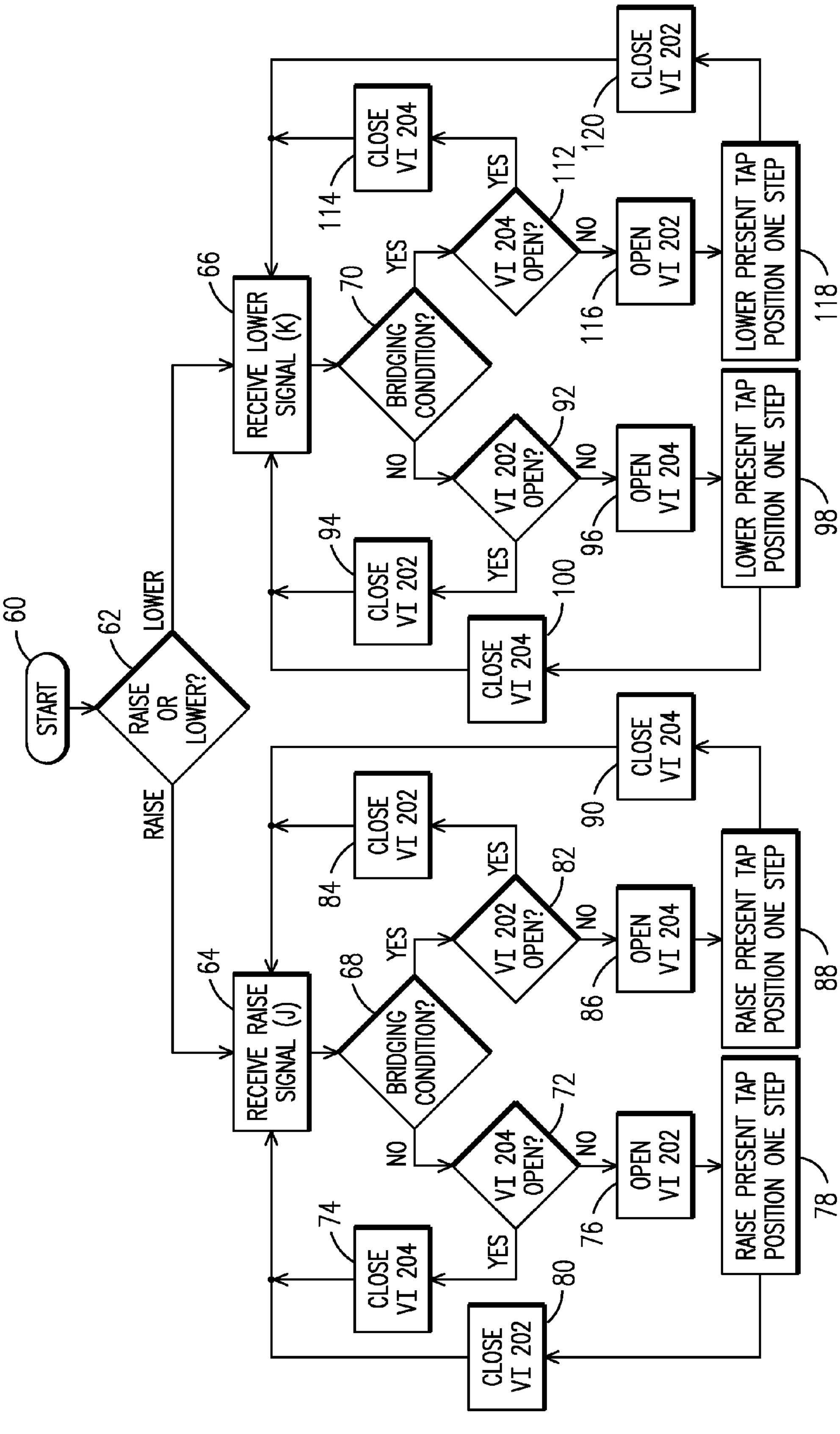
FIG. 3 is a flow chart that illustrates an example control strategy, as may be implemented by a controller to control the switching state of the vacuum interrupters.

FIG. 3 is a flow chart that illustrates an example control strategy, as may be implemented by controller 50, e.g., a suitably programmed processor, to control the switching state of vacuum interrupters 202 and 204 to prevent arcing formation on movable contacts 15, while providing uninterrupted electrical power to the load. This control strategy is premised on two basic considerations: 1) at least one of the vacuum interrupters 202 and 204 remains in an electrically closed condition so that electrical power remains uninterrupted to the electrical load connected to the tap changer; and 2) a respective one of vacuum interrupters 202 and 204 will open before a moving contact breaks electrical contact and will remain open till such moving contact reestablishes electrical contact, thereby such vacuum interrupter acts as an arc quencher to avoid electrical arcing on the moving contact.

Subsequent to start step 60, a decision block 62 allows monitoring appropriate signals to determine a raise or a lower action. In the event a raise action is determined, raise signal (J), as may be supplied from control panel 52 (FIG. 1) through a respective raise limit switch RLS, is processed at block 64, otherwise lower signal (K), as also may be supplied by control panel 52 through a respective lower limit switch LLS, is processed at block 66. Decision blocks 68 and 70, (e.g., based on information contained in OCS signal) each respectively determines whether both contacts 15 are in contact with a tap (i.e., a non-bridging condition) or whether such contacts are in a bridging condition.

In the event decision block 68 determines contacts 15 are not in a bridging condition, then, as shown in decision block 72, a determination is made as to whether or not vacuum interrupter (VI) 204 is in an open switching condition. As shown in block 74, if VI 204 is in an open switching condition, then VI 204 is set to a closed switching condition. Conversely, if VI 204 is in a closed switching condition, then, as shown in block 76, VI 202 is set to an open switching condition and then a present tap position is raised by one step, as shown in block 78. VI 202 may then be closed, as shown in block 80.

In the event contacts 15 are in a bridging condition, then a determination is made in block 82 as to whether or not vacuum interrupter (VI) 202 is in an open switching condition. If VI 202 is in an open switching condition, then at block 84, VI 202 is set to a closed switching condition. Conversely, if VI 202 is in a closed switching condition, then at block 86 VI 204 is set to an open switching condition and then a present tap position is raised by one step, as shown in block 88. VI 204 may then be closed, as shown in block 90.

In the event decision block 70 determines contacts 15 are not in a bridging condition, then, as shown in decision block 92 a determination is made as to whether or not vacuum interrupter (VI) 202 is in an open switching condition. As shown in block 94, if VI 202 is in an open switching condition, then VI 202 is set to a closed switching condition. Conversely, if VI 202 is in a closed switching condition, then, as shown in block 96, VI 204 is set to an open switching condition and then a present tap position is lowered by one step, as shown in block 98. VI 204 may then be closed, as shown in block 100.

In the event block 70 determines contacts 15 are in a bridging condition, then a determination is made in decision block 112 as to whether or not vacuum interrupter (VI) 204 is in an open switching condition. If VI 204 is in an open switching condition, then at block 114, then VI 204 is set to a closed switching condition. Conversely, if VI 202 is in a closed switching condition, then at block 116, VI 202 is set to an open switching condition and then a present tap position is lowered by one step, as shown in block 118. VI 202 may then be closed, as shown in block 120.

Figure 4:
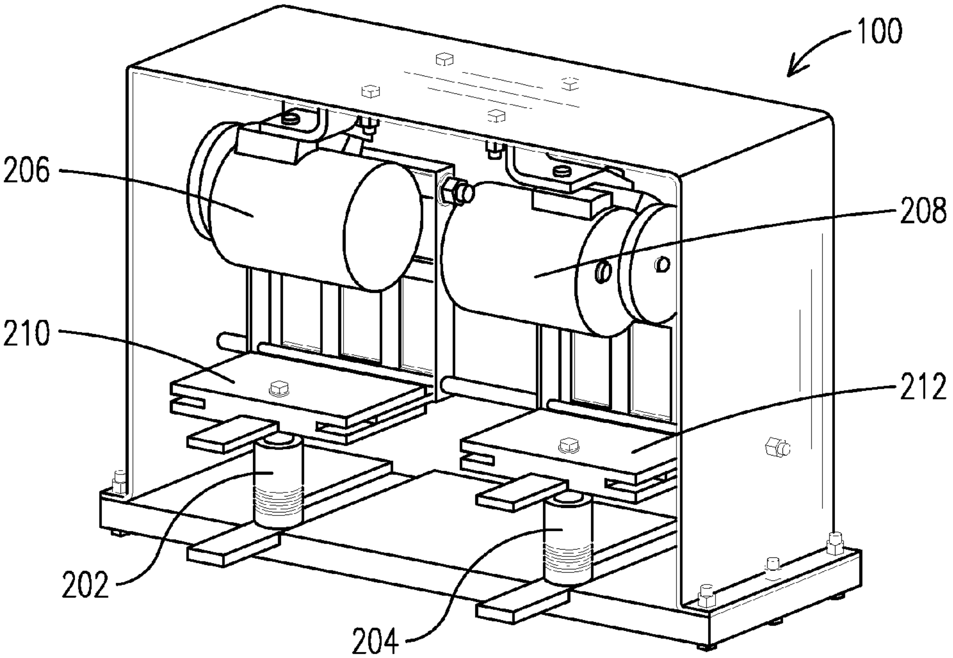
FIG. 4 is a perspective view of an example vacuum switch assembly arranged as a retrofit kit embodying aspects of the present invention.

FIG. 4 is a perspective view of an example vacuum switch assembly 100 in the form of a retrofit kit, which when assembled onto a tap changer manufactured based on circuitry subject to electrical arcing, reconfigures such a tap changer to a tap changer embodying aspects of the present invention. That is, a tap changer free of electrical arcing. In one example embodiment, vacuum switch assembly 100 includes VI 202 and VI 204, each actuated to a respective switching condition (electrically open or electrically closed) by a respective motorized actuator 206 and 208 mechanically connected to a respective lever 210 and 212 arranged to open or close the respective VI based on the status of actuating signals AS1 and AS2 from controller 50.

Figure 5:
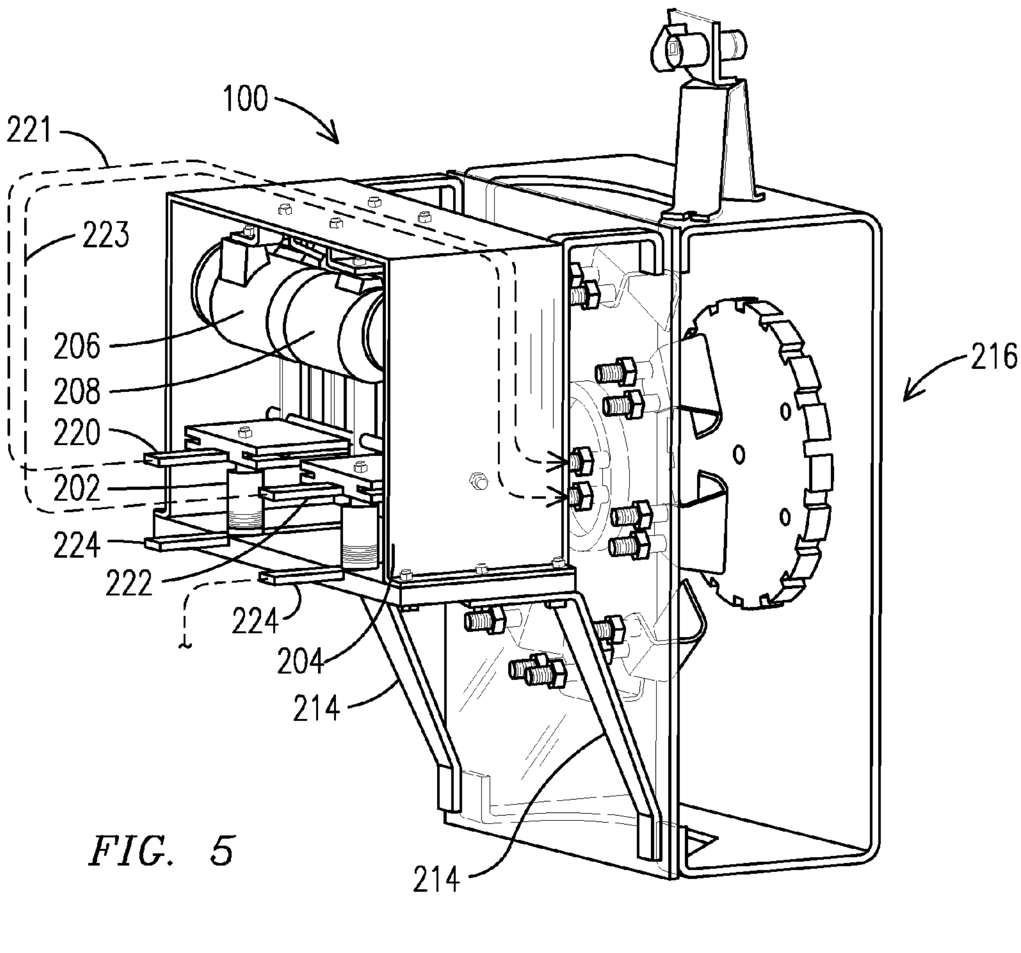
FIG. 5 illustrates assemblage of the retrofit kit of FIG. 4 to reconfigure the tap changer to be free of electrical arcing.

FIG. 5 illustrates assembly of vacuum interrupter assembly 100, as may be affixed by way of mounting brackets 214 or any other suitable affixing structure onto an existing tap changer assembly 216. For example, a first terminal 220 of VI 202 may be electrically connected by a first line 221 to a corresponding terminal of tap changer assembly 216. Similarly, a first terminal 222 of VI 204 may be electrically connected by a second line 223 to a corresponding terminal of tap changer assembly 216. In this example, second terminals 224 of VI 202 and VI 204 supply output voltage 22 on line L (FIG. 1).

It will be appreciated that the installation of a retrofit kit embodying aspects of the present invention is advantageously accomplished without having to modify in any manner regulating transformer 19 connected to taps 14. That is, vacuum assembly 100 is a retrofit kit that can be installed without affecting the transformer side of tap changer 18. This is a particularly attractive feature of a retrofit kit embodying aspects of the present invention. For example, designs that use a traditional reactor type tap-changer as part of the voltage regulator would have to replace or rewind the coil of the voltage regulator and replace the reactor core/coil assembly in order to make use of vacuum-based technology. It will be further appreciated that vacuum assembly 100 operates without bypass switches, which generally add to the complexity of known vacuum-based designs.

In operation, a retro-fit kit embodying aspects of the present invention allows conversion of a voltage regulator manufactured based on arcing-technology to a voltage regulator that provides the advantages of vacuum-based technology without having to replace the entire voltage regulator, or without making changes to the transformer portion of the voltage regulator. A retro-fit kit embodying aspects of the present invention allows eliminating or substantially reducing the frequency of routine maintenance required by the voltage regulator, and effectively making the converted voltage regulator into an essentially maintenance-free piece of equipment. Also environmental impact of a voltage regulator embodying aspects of the present invention will be positive since there will be no longer be a need to replace the transformer fluid. In most cases, such a fluid is refined from naphthenic crude oil.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A retrofit kit for reconfiguring a tap changer having contacts subject to electrical arcing, the kit when installed in the tap changer configured so that said contacts are not exposed to said electrical arcing, the kit comprising:

a vacuum switch assembly comprising a first vacuum interrupter to be electrically coupled to a first electrical contact of the tap changer, the vacuum switch assembly further comprising a second vacuum interrupter to be electrically coupled to a second electrical contact of the tap changer, the first and second contacts selectively movable with respect to a plurality of taps of a regulating transformer of the tap changer, the first and second contacts to be electrically coupled to at least one of the plurality of taps of the regulating transformer, wherein the first vacuum interrupter has a first terminal to be connected in series circuit with said first electrical contact and wherein the second vacuum interrupter has a first terminal to be connected in series circuit with said second electrical contact, wherein each of the first and the second vacuum interrupters is respectively connected to the first and second electrical contacts of the tap changer by way of a respective direct electrical connection free of an electrical impedance element; and a controller configured to generate respective actuating signals so that the first and second vacuum interrupters are selectively actuated to a respective circuit-interrupting condition when a tap change is performed to avoid electrical arcing on said first and second movable contacts.

2. The retrofit kit of claim 1, wherein the vacuum switch assembly further comprises an actuator responsive to the actuating signals from the controller to respectively actuate the first vacuum interrupter and the second vacuum interrupter in accordance with a circuit-interrupting control strategy executed by the controller for performing the tap change.

3. The retrofit kit of claim 1, further comprising a memory to store the circuit-interrupting control strategy for performing the tap change, wherein the circuit-interrupting control strategy comprises at least one of the vacuum interrupters being actuated to an electrically closed condition so that electrical current that flows through a second terminal of said at least one of the vacuum interrupters remains uninterrupted to an electrical load connected to the tap changer, wherein the control strategy for performing the tap change further comprises a respective one of the first and second vacuum interrupters being actuated to an electrically open condition before a moving contact breaks electrical contact from a tap, wherein the respective one of the first and second vacuum interrupters continues in said electrically open condition till said moving contact reestablishes electrical contact with another tap, thereby said respective vacuum interrupter acting as an arc quencher to avoid electrical arcing on the moving contact.

4. The retrofit kit of claim 1, wherein the vacuum switch assembly is electrically coupled to the first and second electrical contacts without having to modify a winding of the regulating transformer.

5. A tap changer comprising:

a regulating transformer having a plurality of taps;

a first electrical contact and a second electrical contact selectively movable with respect to the plurality of taps of the regulating transformer, said first and second contacts electrically coupled to at least one of the plurality of taps of the regulating transformer; and circuitry arranged so that said contacts are not exposed to electrical arcing during a tap change, said circuitry comprising a vacuum switch assembly including a first vacuum interrupter electrically coupled to the first electrical contact of the tap changer, the vacuum switch assembly further including a second vacuum interrupter electrically coupled to the second electrical contact of the tap changer, wherein the first vacuum interrupter has a first terminal connected in series circuit with said first electrical contact, and wherein the second vacuum interrupter has a first terminal connected in series circuit with said second electrical contact, the first and second vacuum interrupters being selectively actuated to a respective circuit-interrupting condition when a tap change is performed to avoid formation of electrical arcing on said first and second movable contacts, wherein each of the first and the second vacuum interrupters is respectively connected to the first and second electrical contacts of the tap changer by way of a respective direct electrical connection free of an electrical impedance element.

6. The tap changer of claim 5 further comprising a controller configured to generate respective actuating signals so that the first and second vacuum interrupters are selectively actuated when a tap change is performed to avoid electrical arcing on said first and second movable contacts.

7. The tap changer of claim 6, wherein the vacuum assembly comprises an actuator responsive to the respective actuating signals from the controller to actuate the first vacuum interrupter and the second vacuum interrupter in accordance with a circuit-interrupting control strategy executed by the controller for performing the tap change.

8. The tap changer of claim 7, further comprising a memory for storing the circuit-interrupting control strategy, wherein the circuit-interrupting control strategy for performing the tap change comprises at least one of the vacuum interrupters being actuated to an electrically closed condition so that electrical current that flows through a second terminal of said at least one of the vacuum interrupters remains uninterrupted to an electrical load connected to the tap changer, wherein the circuit-interrupting control strategy for performing the tap change further comprises a respective one of the first and second vacuum interrupters being actuated to an electrically open condition before a moving contact breaks electrical contact from a tap, wherein the respective one of the first and second vacuum interrupters continues in said electrically open condition till said moving contact reestablishes electrical contact with another tap, thereby said respective vacuum interrupter acting as an arc quencher to avoid electrical arcing on the moving contact.

9. The tap changer of claim 5, wherein the first electrical contact and the second electrical contact are selected from the group consisting of electrical contacts rated to withstand electrical arcing, electrical contacts not rated to withstand electrical arcing and a combination of the foregoing.

10. A voltage regulator comprising:

a tap changer comprising:

a regulating transformer;

a first electrical contact and a second electrical contact selectively movable with respect to a plurality of taps of the regulating transformer, the first and second contacts to be electrically coupled to at least one of the plurality of taps of the regulating transformer; and circuitry arranged so that said contacts are not exposed to electrical arcing during a tap change, said circuitry comprising a vacuum switch assembly comprising a first vacuum interrupter electrically coupled to the first electrical contact of the tap changer, the vacuum switch assembly further comprising a second vacuum interrupter electrically coupled to the second electrical contact of the tap changer, wherein the first vacuum interrupter is connected in series circuit with said first contact, and wherein the second vacuum interrupter is connected in series circuit with said second contact, the first and second vacuum interrupters being selectively actuated when a tap change is performed to avoid formation of electrical arcing on said first and second contacts, wherein each of the first and the second vacuum interrupters is respectively connected to the first and second electrical contacts of the tap changer by way of a respective direct electrical connection free of an electrical impedance element; and a controller configured to generate respective actuating signals so that the first and second vacuum interrupters are selectively actuated to a respective circuit-interrupting condition when a tap change is performed to avoid electrical arcing on said first and second movable contacts.

11. The voltage regulator of claim 10, wherein the vacuum assembly comprises an actuator responsive to the actuating signals from the controller to actuate the first vacuum interrupter and the second vacuum interrupter in accordance with a circuit-interrupting control strategy executed by the controller for performing the tap change.

12. The voltage regulator of claim 11, further comprising a memory for storing the circuit-interrupting control strategy, wherein the circuit-interrupting control strategy for performing the tap change comprises at least one of the vacuum interrupters being actuated to an electrically closed condition so that electrical power remains uninterrupted to an electrical load connected to the tap changer, wherein the control strategy for performing the tap change further comprises a respective one of the first and second vacuum interrupters being actuated to an electrically open condition before a moving contact breaks electrical contact from a tap, wherein the respective one of the first and second vacuum interrupters continues in said electrically open condition till said moving contact reestablishes electrical contact with another tap, thereby said respective vacuum interrupter acting as an arc quencher to avoid electrical arcing on the moving contact.

13. A method for reconfiguring a tap changer having contacts subject to electrical arcing, the reconfiguring of the tap changer arranged so that said contacts are not exposed to said electrical arcing, the method comprising:

electrically coupling a vacuum switch assembly to a first electrical contact of the tap changer and to a second electrical contact of the tap changer, the first and second contacts selectively movable with respect to a plurality of taps of a regulating transformer of the tap changer, the first and second contacts to be electrically coupled to at least one of the plurality of taps of the regulating transformer;

connecting in series circuit a first terminal of a first vacuum interrupter of the vacuum assembly with said first electrical contact;

connecting in series circuit a first terminal of a second vacuum interrupter of the vacuum assembly with said first electrical contact;

respectively connecting each of the first and the second vacuum interrupters to the first and second electrical contacts of the tap changer by way of a respective direct electrical connection free of an electrical impedance element; and configuring a controller to generate respective actuating signals so that the first and second vacuum interrupters are selectively actuated to a respective circuit-interrupting condition when a tap change is performed to avoid electrical arcing on said first and second movable contacts.

14. The method of claim 13, further comprising actuating the first vacuum interrupter and the second vacuum interrupter in accordance with a control strategy executed by the controller for performing the tap change.

15. The method of claim 13, wherein the control strategy comprises actuating at least one of the vacuum interrupters to an electrically closed condition so that a flow of electrical current remains uninterrupted to an electrical load connected to the tap changer, wherein the control strategy for performing the tap change further comprises actuating a respective one of the first and second vacuum interrupters to an electrically open condition before a moving contact breaks electrical contact from a tap, wherein the respective one of the first and second vacuum interrupters continues in said electrically open condition till said moving contact reestablishes electrical contact with another tap, thereby said respective vacuum interrupter acting as an arc quencher to avoid electrical arcing on the moving contact.

* * * * *